US008843557B2

(12) United States Patent
Ranade

(10) Patent No.: US 8,843,557 B2
(45) Date of Patent: Sep. 23, 2014

(54) COMMUNICATIONS AMONG USERS BELONGING TO AFFILIATIONS SPANNING MULTIPLE VIRTUAL SPACES

(75) Inventor: Amit Ranade, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 123 days.

(21) Appl. No.: 13/330,242

(22) Filed: Dec. 19, 2011

(65) Prior Publication Data

US 2013/0159430 A1    Jun. 20, 2013

(51) Int. Cl.
G06F 15/16    (2006.01)

(52) U.S. Cl.
USPC ........... 709/204; 709/205; 709/206; 709/223; 715/757; 715/758

(58) Field of Classification Search
USPC ........................................................ 709/206
See application file for complete search history.

(56) References Cited

U.S. PATENT DOCUMENTS

| | | | | |
|---|---|---|---|---|
| 6,951,516 | B1 | 10/2005 | Eguchi et al. | 463/40 |
| 7,056,217 | B1 | 6/2006 | Pelkey et al. | 463/43 |
| 7,522,058 | B1 | 4/2009 | Light et al. | 340/573.1 |
| 7,780,530 | B2 | 8/2010 | Ushiro et al. | 463/42 |
| 8,137,193 | B1 | 3/2012 | Kelly et al. | 463/31 |
| 8,137,194 | B1 | 3/2012 | Kelly et al. | 463/31 |
| 8,214,487 | B2 | 7/2012 | Savoor et al. | 709/224 |
| 8,257,174 | B2 | 9/2012 | Pincus et al. | 463/31 |
| 8,347,225 | B2 | 1/2013 | Blinnikka et al. | 715/787 |
| 8,347,322 | B1 | 1/2013 | Brown et al. | 719/328 |
| 8,353,760 | B2 | 1/2013 | Ocko et al. | 463/25 |
| 8,622,828 | B1 | 1/2014 | Harrington | 463/31 |
| 8,663,004 | B1 | 3/2014 | Xu | 463/29 |
| 8,734,243 | B2 | 5/2014 | Harrington | 463/29 |
| 2003/0078960 | A1 | 4/2003 | Murren et al. | 709/203 |

(Continued)

FOREIGN PATENT DOCUMENTS

| | | |
|---|---|---|
| EP | 2 383 683 | 11/2011 |
| WO | WO 2013/086268 | 6/2013 |
| WO | WO 2013/096261 | 6/2013 |
| WO | WO 2013/103655 | 7/2013 |

OTHER PUBLICATIONS

Johnston, Ken, VSCpr for GREE, Inc. "GREE Gaming Platform Provides Global User Base for All Developers. New Platform Offers Unified Social Gaming System", Burlingame, CA, PRWeb, Dec. 5, 2011, 2 pages.

(Continued)

*Primary Examiner* — Hamza Algibhah
*Assistant Examiner* — Natisha Cox
(74) *Attorney, Agent, or Firm* — Pillsbury Winthrop Shaw Pittman LLP

(57) ABSTRACT

Communications may be facilitated among users belonging to affiliations spanning two or more virtual spaces accessible via virtual environments. In exemplary implementations, affiliations within individual virtual spaces may be managed. A given affiliation within a given virtual space may comprise a discrete group of users with a relationship having a functional significance within the given virtual space. A communications interface may be provided for presentation to individual users. The communications interface may be configured to enable a given user to observe in-coming communications and provide out-going communications. Synchronous and/or asynchronous communications may be facilitated via the communications interface between users belonging to one or more common affiliations. The communications may be facilitated among users belonging to a common overarching affiliation, which may encompass two or more affiliations from different virtual spaces that include substantially the same group of users.

31 Claims, 3 Drawing Sheets

(56) References Cited

U.S. PATENT DOCUMENTS

| | | | |
|---|---|---|---|
| 2004/0117386 A1 | 6/2004 | Lavender et al. | 707/100 |
| 2005/0272504 A1 | 12/2005 | Eguchi et al. | 463/40 |
| 2006/0121986 A1 | 6/2006 | Pelkey et al. | 463/40 |
| 2007/0150603 A1 | 6/2007 | Crull et al. | 709/227 |
| 2007/0233736 A1 | 10/2007 | Xiong et al. | 707/104.1 |
| 2007/0274460 A1* | 11/2007 | Shaffer et al. | 379/37 |
| 2008/0119277 A1 | 5/2008 | Thelen | 463/42 |
| 2008/0134035 A1 | 6/2008 | Pennington et al. | 715/713 |
| 2008/0187143 A1 | 8/2008 | Mak-Fan | 381/17 |
| 2009/0034696 A1 | 2/2009 | Ramanathan | 379/88.17 |
| 2009/0112989 A1 | 4/2009 | Anderson et al. | 709/204 |
| 2009/0144075 A1* | 6/2009 | Flinn et al. | 705/1 |
| 2009/0172795 A1 | 7/2009 | Ritari et al. | 726/7 |
| 2009/0197681 A1 | 8/2009 | Krishnamoorthy et al. | 463/42 |
| 2009/0325712 A1 | 12/2009 | Rance | 463/42 |
| 2009/0327232 A1 | 12/2009 | Carter et al. | 707/3 |
| 2009/0327427 A1* | 12/2009 | Mathew et al. | 709/206 |
| 2009/0327882 A1* | 12/2009 | Velusamy | 715/269 |
| 2010/0024015 A1 | 1/2010 | Hardt | 726/6 |
| 2010/0063969 A1* | 3/2010 | Kasargod et al. | 707/740 |
| 2010/0106782 A1 | 4/2010 | Huang et al. | 709/206 |
| 2010/0169798 A1 | 7/2010 | Hyndman et al. | 715/757 |
| 2010/0197409 A1 | 8/2010 | Van Luchene | 463/42 |
| 2010/0216553 A1* | 8/2010 | Chudley et al. | 463/42 |
| 2010/0228617 A1 | 9/2010 | Ransom et al. | 705/14.25 |
| 2010/0229106 A1 | 9/2010 | Lee et al. | 715/757 |
| 2010/0235754 A1 | 9/2010 | Leitheiser | 715/742 |
| 2010/0304862 A1 | 12/2010 | Coleman et al. | 463/32 |
| 2011/0014972 A1 | 1/2011 | Herrmann et al. | 463/25 |
| 2011/0016488 A1 | 1/2011 | Athias | 725/53 |
| 2011/0022450 A1 | 1/2011 | Meredith | 705/14.4 |
| 2011/0107239 A1 | 5/2011 | Adoni et al. | 715/757 |
| 2011/0131508 A1 | 6/2011 | Gershfang et al. | 715/757 |
| 2011/0151976 A1 | 6/2011 | Holloway et al. | 463/42 |
| 2011/0202605 A1* | 8/2011 | Shochet et al. | 709/205 |
| 2011/0212783 A1 | 9/2011 | Dale et al. | 463/42 |
| 2011/0237335 A1 | 9/2011 | Holloway et al. | 463/42 |
| 2011/0238608 A1 | 9/2011 | Sathish | 706/47 |
| 2011/0250949 A1 | 10/2011 | Van Os et al. | 463/25 |
| 2011/0269548 A1* | 11/2011 | Barclay et al. | 463/42 |
| 2012/0047008 A1 | 2/2012 | Alhadeff et al. | 705/14.16 |
| 2012/0054646 A1* | 3/2012 | Hoomani et al. | 715/758 |
| 2012/0077523 A1 | 3/2012 | Roumeliotis et al. | 455/456.3 |
| 2012/0124147 A1* | 5/2012 | Hamlin et al. | 709/206 |
| 2012/0142429 A1* | 6/2012 | Muller | 463/42 |
| 2012/0202587 A1* | 8/2012 | Allen et al. | 463/25 |
| 2012/0227086 A1 | 9/2012 | Dale et al. | 726/3 |
| 2012/0252579 A1 | 10/2012 | Sethi et al. | 463/40 |
| 2012/0290949 A1 | 11/2012 | Elenzil et al. | 715/753 |
| 2013/0005476 A1 | 1/2013 | Keswani et al. | 463/42 |
| 2013/0014033 A1* | 1/2013 | Hamick et al. | 715/757 |
| 2013/0091221 A1* | 4/2013 | Bennett | 709/204 |
| 2013/0143669 A1* | 6/2013 | Muller | 463/42 |
| 2013/0151604 A1 | 6/2013 | Ranade | 709/204 |
| 2013/0172085 A1 | 7/2013 | Harrington | 463/42 |
| 2014/0179434 A1 | 6/2014 | Xu | 463/31 |

OTHER PUBLICATIONS

"Buddy Rush:: The World's Best Cross-platform RPG!", http://buddyrush.sollmo.com/, printed Nov. 28, 2011, copyright 2011 by Team Sollmo with Company 11, Inc., 2 pages.

"FriendFeed", definition from Wikipedia, the free encyclopedia, printed Nov. 28, 2011, 3 pages.

Webster, Andrew, "Social games need to become truly cross-platform", http://www.gamezebo.com/news/2011/06/08/social-games-need-become-truly-cross-platform, posted Jun. 8, 2011, printed Nov. 28, 2011, 2 pages.

Hendericks, Mark, "Watch out FriendFeed: Socialthing! Is Even Easier to Use",http://techcrunch.com/2008/03/10/watch-out-friendfeed-socialthing-is-even-easier-to-use/, posted Mar. 10, 2008, printed Nov. 28, 2011, 2 pages.

* cited by examiner

COMMUNICATIONS AMONG USERS BELONGING TO AFFILIATIONS SPANNING MULTIPLE VIRTUAL SPACES

FIELD OF THE DISCLOSURE

This disclosure relates to facilitating communications among users belonging to affiliations spanning multiple virtual spaces.

BACKGROUND

Systems exist for forming and/or recognizing affiliations between users of virtual spaces (e.g., video games or other virtual spaces). An affiliation may include an alliance, guild, cohort, and/or other affiliation with a discrete group of users. Typically, however, existing approaches involve affiliations limited to a single virtual space. Existing systems generally lack integrated communication capabilities between users belonging to the same affiliations in different virtual spaces.

SUMMARY

One aspect of the disclosure relates to a system configured to facilitate communications among users belonging to affiliations spanning two or more virtual spaces accessible via virtual environments, in accordance with one or more implementations. In exemplary implementations, a group of users may belong to an affiliation within a first virtual space. For example, the group of users may belong to an alliance within a social network game played in a social network virtual environment. The same affiliation may be "transported" to other virtual spaces such that the same group of users are affiliated in more that one virtual space. The affiliations in different virtual spaces, which include substantially the same group of users, may be encompassed by an overarching affiliation. Synchronous and/or asynchronous communications may be facilitated via a communications interface between users belonging to one or more common affiliations. In some implementations, the communications may be facilitated among users belonging to a common overarching affiliation. In some implementations, the system may include one or more of at least one virtual environment server, at least one virtual space server, and/or other components.

The virtual environment server may be configured to execute one or more computer program modules. The computer program modules may include one or more of a user module, an environment module, an interaction module, a relationship module, and/or other modules. The user module may be configured to access and/or manage one or more user profiles and/or user information associated with users of the system.

The environment module may be configured to provide one or more virtual environments to users via the client computing platforms. As used herein, a "virtual environment" may include one or more interactive, electronic social media, and/or other virtual environments. Interactive, electronic social media may include one or more of a social network, a virtual space, a micro-blogging service, a blog service (or host), a messaging service, a message board, a forum, and/or other electronically distributed media that are scalable and enable interaction between the users.

The interaction module may be configured to monitor interactions of the users with the virtual environment and/or each other within the virtual environment. This may include monitoring, for a given user, one or more of times at which the given user is logged in to the virtual environment, areas of the virtual environment the given user views or interacts with or in, other users the given user interacts with, the nature and/or content of interactions of the given user with other users, activities participated in within the virtual environment, level, powers, or skill attained in the virtual environment, inventory items obtained in the virtual environment, and/or other interactions of the given user with the virtual environment and/or other users.

At a given time, interaction module may determine a set of users that are currently engaged with the virtual environment and/or a set of users that are currently not engaged with the virtual environment. Being engaged with the virtual environment may refer to being logged in to the virtual environment, performing some action or interaction within the virtual environment within some period of time (e.g., the last 2 minutes), and/or other taking some other action indicating ongoing and contemporaneous engagement with the virtual environment.

The relationship module may be configured to establish relationships between users within the virtual environment. Such relationships may include one or more of friendships, connections, followers, social links, and/or other relationships. The relationship module may establish relationships based on relationship requests and acceptances received from users. Relationships may include one or more types of relationships that have a functional purpose or impact within the virtual environment, and/or one or more types of relationships that a social construct within the virtual environment that does not have a functional result.

The virtual space server may be configured to execute one or more computer program modules. The computer program modules may include one or more of a space module, a space account module, a group module, an overarching group module, a communication interface module, a synchronous communications module, an affiliate status module, an asynchronous communications module, a privileges module, an alert module, a broadcast module, and/or other modules.

The space module may be configured to provide one or more virtual spaces to users via client computing platforms. As used herein, a "virtual space" may include one or more social network games and/or other virtual spaces. A virtual space may be provided via a virtual environment provided by the environment module of the virtual environment server. For example, a user may be required to be engaged in a virtual environment in order to engage in a virtual space. According to various implementations, one or more instances of a single given virtual space may be provided via one or more different virtual environments.

The space module may determine views of the virtual space. The views may then be communicated (e.g., via streaming, via object/position data, and/or other information) from the virtual space server to the client computing platforms for presentation to users. The view determined and transmitted to a given client computing platform may correspond to a user character being controlled by a user via the given client computing platform. The view determined and transmitted to a given client computing platform may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

An instance of a virtual space may comprise a simulated space that is accessible by users via clients (e.g., the client computing platforms) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

Within the instance(s) of a virtual space executed by the space module, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through the client computing platforms. The users may interact with each other through communications exchanged within the virtual space. Such communications may include one or more of textual chat, instant messages, private messages, voice communications, and/or other communications. Communications may be received and entered by the users via their respective client computing platforms. Communications may be routed to and from the appropriate users through the virtual space server and/or the virtual environment server. Within the virtual space, users may participate in a game. The game may be an activity within the space (e.g., a virtual card or board game within the space), or the game may actually be the space (e.g., an online role-playing game, massively multiplayer online game, a social online game, and/or other games).

The space account module may be configured to manage accounts associated with the individual users for individual virtual spaces. The accounts may include user information associated with the individual users. Such user information may include one or more of identification information; inventory information; financial information; relationship information; information related to the users determined by one or more other modules; demographic information; usage information; past purchase history; and/or other information related to the users. The identification information may include one or more of a username, an avatar name, a real world identification, and/or other identification information. The inventory information may identify virtual objects, virtual currency, and/or other assets available to the users. The virtual objects and/or virtual currency available to a given user may include the virtual objects and/or the virtual currency that is under the control of the given user within the virtual space. The financial information may include payment information such as an account identification that identifies an account that can be used by the user to purchase virtual goods and/or virtual currency for use within the virtual space. The funds available in the account may include real world money or funds, virtual money or funds that are not usable within the virtual space, and/or other funds.

The group module may be configured to a group module configured to establish and/or manage affiliations within individual virtual spaces. A given affiliation within a given virtual space may include a discrete group of users. For example, a first affiliation within a first virtual space may include a first user, a second user, and/or a discrete set of other users. Examples of an affiliation may include an alliance, a guild, a faction, a club, an association, a group, a crew, a band, a clan, a family, fellowship, a gang, a league, a partnership, a syndicate, a society, a tribe, a troop, a company, and/or other affiliations that include a discrete group of individuals.

The group module may establish affiliations based on affiliation requests and acceptances received from users. Establishment of an affiliation may be initiated by a single communication (e.g., a request) initiated by a given user requesting an affiliation between the given user and one or more other users. Establishment of an affiliation may require a first communication from the given user to be approved by the one or more other users. According to some implementations, the group module may establish affiliations intrinsically within the virtual space (e.g., faction-mates are formed based on avatar configuration), through recognized user behavior over time (e.g., raid members or player-versus-player partners), and/or other approaches for establishing affiliations.

Users belonging to an affiliation may have relationships with some or no functional significance, purpose, and/or impact within a given virtual space. Such relationships within the affiliation may include a leadership structure, a role structure, and/or other relationships within the affiliation. The functional significance of a relationship between users may vary across different virtual spaces. For example, a relationship between the first user and the second user in the first affiliation within the first virtual space may have a different functional significance than a relationship between the first user and the second user in a second affiliation in a second virtual space. By way of non-limiting example of the functional significance of an affiliation within an exemplary virtual space, affiliates within a virtual space may have certain capabilities among each other that are not available to non-affiliates such as sharing and/or trading goods, services, player characters, and/or items in the virtual space; and/or other capabilities among users belonging to an affiliation.

The overarching group module may be configured to determine one or more overarching affiliations. An overarching affiliation may encompass two or more affiliations from different virtual spaces that include substantially the same group of users. By way of non-limiting example, a given overarching affiliation may encompass an affiliation in one virtual space (e.g., a team) and an affiliation in another virtual space (e.g., a gang), where the two affiliations include substantially the same group of users. A given overarching affiliation may facilitate one or more of a cooperative attack, a cooperative defense, resource trading, troupe enforcements, and/or other actions carried out by a group in individual virtual spaces by individual users belonging to the given overarching affiliation. The group module may be configured to automatically include a given user belonging to a given overarching affiliation in individual affiliations encompassed by the given overarching affiliation. A given user may be enabled to opt-in or opt-out of being automatically included in individual affiliations encompassed by an overarching affiliation.

The overarching group module may be configured to link affiliations from different virtual spaces to yield an overarching affiliation. Such linking may be performed automatically, manually, and/or by a combination of automatic and manual operations. In some implementations, the overarching group module may monitor affiliations in two or more virtual spaces to determine affiliations including substantially the same group of users for inclusion in an overarching affiliation. A user belonging to affiliations in different virtual spaces may manually link the affiliations so as to be encompassed by an overarching affiliation. In some implementations, responsive to a first user joining a first affiliation in a first virtual space, the first user may be presented with an option to join one or more other affiliations in other virtual spaces that are encompassed by the same overarching affiliation as the first affiliation. Such an option may be presented even if the first user has not engaged one or more of the other virtual spaces, according to some implementations.

The communication interface module may be configured to provide a communications interface for presentation to individual users. The communications interface may be presented to given user via a client computing platform associated with that user. The communications interface may be configured to enable a given user to observe in-coming communications and provide out-going communications. According to some implementations, the communications interface may be presented within a virtual space provided by the virtual space server. The communications interface may be presented within a virtual environment provided by the virtual environment server. In some implementations, the communications interface may be presented outside of a virtual space and outside of a virtual environment. For example, the communications interface may be presented via a webpage that includes neither a virtual space nor a virtual environment. As another example, the communications interface may be provided via a mobile application on a mobile implementation of a client computing platform.

The synchronous communications module may be configured to facilitate synchronous communications via the communications interface between users belonging to one or more common affiliations. The synchronous communications module may be configured to facilitate synchronous communications among users belonging to a common overarching affiliation. By way of non-limiting example, synchronous communications may include one or more of text-based instant messaging (IM) and/or chat, live voice and/or video communications, other forms of real-time direct communications, and/or other synchronous communications. The synchronous communications may be channeled across multiple virtual spaces and/or multiple environments. For example, in some implementations, the first user and the second user are enabled to exchange synchronous communications while the first user is engaged in the first virtual space and the second user is engaged in a second virtual space. Two or more users may engage in a single synchronous communications session. In some implementations, synchronous communications module 126 may be configured to facilitate file transfers between users. The synchronous communications module 126 may utilize, leverage, and/or otherwise interface with third-party synchronous communications services (e.g., Facebook chat, Google chat, ICQ, and/or other services), in accordance with some implementations.

The affiliate status module may be configured to provide an indication via the communications interface of whether one or more users belonging to individual ones of the common affiliations and/or common overarching affiliations are available to exchange synchronous communications. According to various implementations, a given user may be available if the user is engaged in a specific virtual space, is engaged in a specific virtual environment, has checked or logged into the communication interface, has provided an indication that the given user is available, and/or is otherwise declared as being available to exchange synchronous communications. The indication may indicate which virtual space and/or virtual environment the given user is currently engaged in. Indications provided by the affiliate status module may be presented by one or more of a textual indication, a visual indicate, and/or another indication. In some implementations, indications provided by the affiliate status module may be presented as an affiliate list showing a number of users belonging to one or more common affiliations and/or one or more common overarching affiliations, along with their respective availabilities.

The asynchronous communications module may be configured to facilitate asynchronous communications via the communications interface between users belonging to one or more common affiliations. The asynchronous communications module may be configured to facilitate asynchronous communications among users belonging to a common overarching affiliation. By way of non-limiting example, asynchronous communications may include one or more of emails, communications based on a store-and-forward model, and/or other asynchronous communications. The asynchronous communications module may be configured to accept, forward, deliver, and/or store asynchronous communications. The asynchronous communications module may utilize, leverage, and/or otherwise interface with an asynchronous communications server (not depicted) to facilitate asynchronous communications. The asynchronous communications may by conveyed whether or not a receiving party is engaged in a virtual space or virtual environment. For example, the first user may be enabled to send the second user asynchronous communications regardless of whether the second user is engaged in a virtual space or a virtual environment.

The asynchronous communications module may be configured to manage inboxes associated with individual users. For example, a first inbox may be associated with the first user such that the first inbox is configured to contain an asynchronous communication sent by the second user to the first user. The inboxes may be presented via the communications interface. A given inbox may have multiple instantiations in different virtual spaces and/or virtual environments. In some implementations, a user may access the user's inbox via a mobile application on a mobile implementation of a client computing platform. In some implementations, two or more asynchronous communications contained by a given inbox may be organized within the given inbox based on individual affiliations associated with the asynchronous communications contained by the given inbox. For example, one or more asynchronous communications associated with the first virtual space may be collocated in a list or file, while one or more asynchronous communications associated with the second virtual space may be collocated separately from the ones associated with the first virtual space.

The privileges module may be configured to manage privileges associated with individual users based on statuses attributed to the individual users. Examples of such statuses may include statuses associated with one or more of progress within a virtual space; time spent engaging in a virtual space and/or virtual environment; a date on which a user joined an affiliation and/or overarching affiliation; a leadership and/or other role within a virtual space, affiliation, and/or overarching affiliation; and/or other statuses attributable to users. By way of non-limiting example, privileges may include being able to preview, approve, and/or edit communications of other users; having communications sent by a privileged user appear visually different from unprivileged users; being able to preview, approve, and/or edit alerts (discussed in further detail in connection with the alert module; having enhanced broadcast rights (discussed further in connection with the broadcast module); and/or other privileges associable to users. As a non-limiting illustration, the first user may be enabled to edit asynchronous communications of one or more other users belonging to the first affiliation responsive to a first privilege being associated with the first user and the first privilege being unassociated with the one or more other users belonging to the first affiliation. As another illustration, communications from the first user may be visibly distinct in the communications interface from communications from one or more other users responsive to a second privilege being associated with the first user and the second privilege being unassociated with the one or more other users belonging to the first affiliation.

The privileges module may be configured to provide a privileged communications interface, which may be included in or separate from the communications interface provided by the communication interface module. The privileged communications interface may enable a given privileged user to preview and/or edit communications sent by unprivileged users.

The alert module may be configured to distribute alerts via the communications interface to individual users belonging to the one or more common affiliations and/or common overarching affiliations. Individual ones of the alerts may be distributed responsive to one or more predetermined events occurring within one or more virtual spaces associated with the one or more common affiliations and/or common overarching affiliations. By way of illustration, an alert may be sent to all members of a given overarching affiliation responsive to a battle situation within a virtual space encompassed by the given overarching affiliation. The alerts may be distributed regardless of whether the individual users belonging to the one or more common affiliations and/or common overarching affiliations are engaged in the one or more virtual spaces associated therewith. In some implementations, different forms of a given alert may be distributed to different users according to different privileges associated with those users. For example, a first alert sent to a user associated with a privilege may contain different information relative to the first alert sent to a user unassociated with the privilege.

The alerts may be presented in various manners. The alerts may be presented to users via the communications interface provided by the communication interface module. The alerts may be presented as synchronous communications, asynchronous communications, and/or other types of communications. The alert module may be configured to provide an alerts interface, which may be included in or separate from the communications interface provided by the communication interface module. The alerts interface may enable a given user to observe in-coming alerts.

The broadcast module may be configured to enable one or more individual users to transmit a broadcast communication to two or more other users belonging to a common affiliation and/or common overarching affiliation. A broadcast communication may include a broadcast communication one or both of a synchronous communication or an asynchronous communication. The broadcast module may be configured to transmit a broadcast communication regardless of whether individual recipient users are engaged in a virtual space and/or virtual environment. In some implementations, a privileged user may be enabled to preview, approve, and/or edit broadcast communications prior to the broadcast communications being delivered to other users.

The broadcast module may be configured to provide a broadcast communications interface, which may be included in or separate from the communications interface provided by the communication interface module. The broadcast communications interface may enable a given user to observe in-coming broadcast communications and/or provide out-going broadcast communications.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
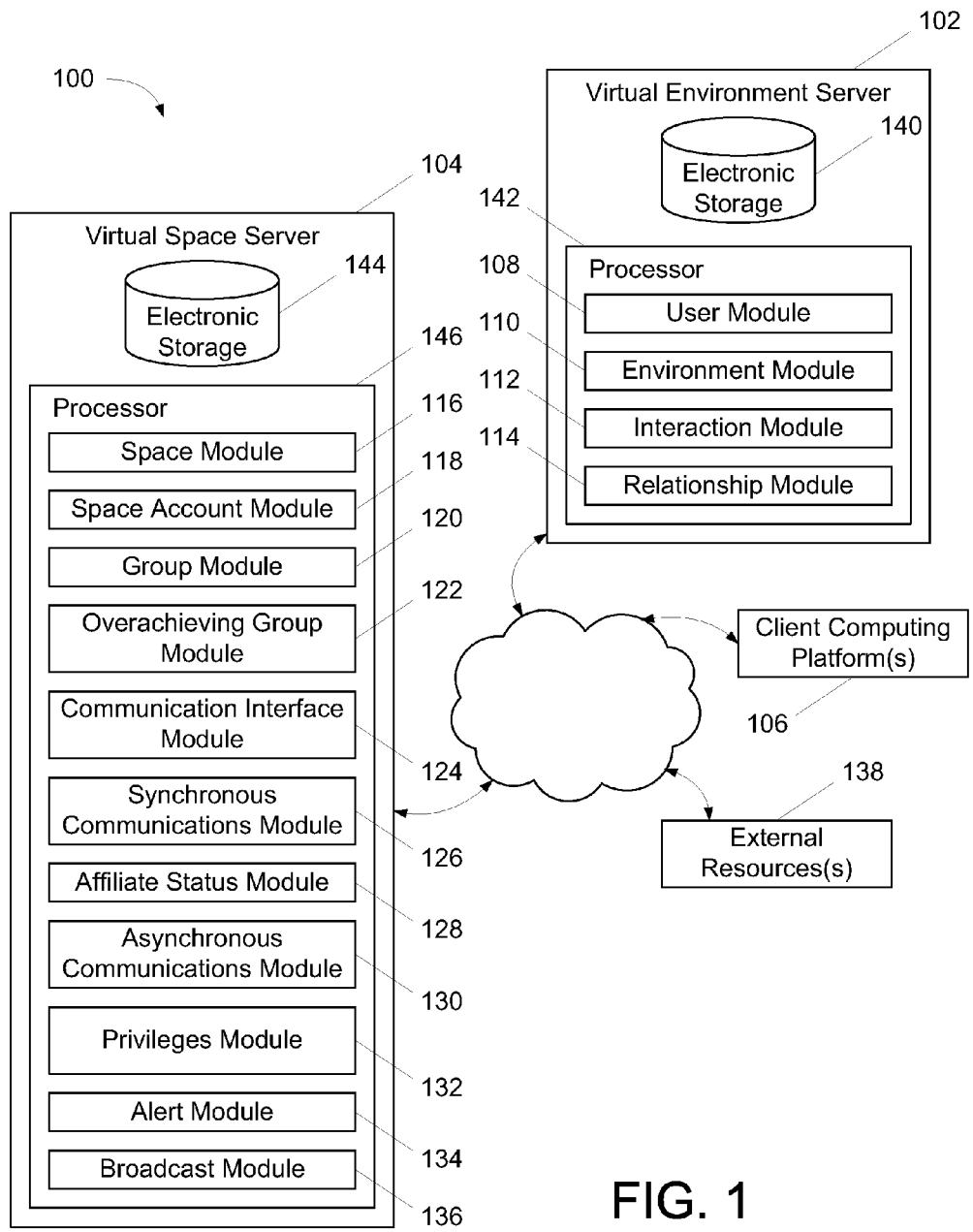
FIG. 1 illustrates a system configured to facilitate communications among users belonging to affiliations spanning two or more virtual spaces accessible via virtual environments, in accordance with one or more implementations.

FIG. 1 illustrates a system 100 configured to facilitate communications among users belonging to affiliations spanning two or more virtual spaces accessible via virtual environments, in accordance with one or more implementations. In exemplary implementations, a group of users may belong to an affiliation within a first virtual space. For example, the group of users may belong to an alliance within a social network game played in a social network virtual environment. The same affiliation may be "transported" to other virtual spaces such that the same group of users are affiliated in more that one virtual space. The affiliations in different virtual spaces, which include substantially the same group of users, may be encompassed by an overarching affiliation. Synchronous and/or asynchronous communications may be facilitated via a communications interface between users belonging to one or more common affiliations. In some implementations, the communications may be facilitated among users belonging to a common overarching affiliation.

In some implementations, system 100 may include one or more of at least one virtual environment server 102, at least one virtual space server 104, and/or other components. The virtual environment server 102 and/or virtual space server 104 may be configured to communicate with one or more client computing platforms 106 according to a client/server architecture to provide the virtual environment and/or the virtual space to users via client computing platforms 106. The virtual space server 104 may be configured to interface with virtual environment server 102 to supplement the functionality provided to the users with respect to the virtual environment and/or the virtual space. For example, virtual space server 104 may interface with virtual environment server 102 via one or more application programming interfaces.

The virtual environment server 102 may be configured to execute one or more computer program modules. The computer program modules may include one or more of a user module 108, an environment module 110, an interaction module 112, a relationship module 114, and/or other modules.

The user module 108 may be configured to access and/or manage one or more user profiles and/or user information associated with users of system 100. The one or more user profiles and/or user information may include information stored by virtual environment server 102, virtual space server 104, one or more of the client computing platforms 106, and/or other storage locations. The user profiles may include, for example, information identifying users (e.g., a username or handle, a number, an identifier, and/or other identifying information) within the virtual environment, security login information (e.g., a login code or password), virtual environment account information, subscription information, virtual currency account information (e.g., related to currency held in credit for a user), relationship information (e.g., information related to relationships between users in the virtual environment), virtual environment usage information, demographic information associated with users, interaction history among users in the virtual environment, information stated by users, purchase information of users, browsing history of users, a client computing platform identification associated with a user, a phone number associated with a user, and/or other information related to users.

The environment module 110 may be configured to provide one or more virtual environments to users via client computing platforms 106. As used herein, a "virtual environment" may include one or more interactive, electronic social media, and/or other virtual environments. Interactive, electronic social media may include one or more of a social network, a virtual space, a micro-blogging service, a blog service (or host), a messaging service, a message board, a forum, and/or other electronically distributed media that are scalable and enable interaction between the users. Some non-limiting specific examples of interactive, electronic social media may include the social network provided by Facebook™, the social network provided by MySpace™, the social network provided by Google+™, the social network provided by Qzone™, the social network provided by Foursquare®, the micro-blogging service provided by Twitter™, the virtual world provided by SecondLife®, the massively multi-player online game provided by World of Warcraft®, the file sharing service provided by Flickr®, Blogger, YouTube, PlayStation® Home, Xbox® Live, and/or other interactive, electronic social media.

The interaction module 112 may be configured to monitor interactions of the users with the virtual environment and/or each other within the virtual environment. This may include monitoring, for a given user, one or more of times at which the given user is logged in to the virtual environment, areas of the virtual environment the given user views or interacts with or in, other users the given user interacts with, the nature and/or content of interactions of the given user with other users, activities participated in within the virtual environment, level, powers, or skill attained in the virtual environment, inventory items obtained in the virtual environment, and/or other interactions of the given user with the virtual environment and/or other users. Some or all of the information generated by interaction module 112 in monitoring the interactions of the users may be stored to the user profiles managed by user module 108.

At a given time, interaction module 112 may determine a set of users that are currently engaged with the virtual environment and/or a set of users that are currently not engaged with the virtual environment. Being engaged with the virtual environment may refer to being logged in to the virtual environment, performing some action or interaction within the virtual environment within some period of time (e.g., the last 2 minutes), and/or other taking some other action indicating ongoing and contemporaneous engagement with the virtual environment.

The relationship module 114 may be configured to establish relationships between users within the virtual environment. Such relationships may include one or more of friendships, connections, followers, social links, and/or other relationships. The relationship module 114 may establish relationships based on relationship requests and acceptances received from users. Establishment of a relationship may be initiated by a single communication (e.g., a request) initiated by a given user requesting a relationship between the given user and one or more other users. Establishment of a relationship may require a first communication from the given user to be approved by the one or more other users. Relationships may include one or more types of relationships that have a functional purpose or impact within the virtual environment, and/or one or more types of relationships that a social construct within the virtual environment that does not have a functional result.

The virtual space server 104 may be configured to execute one or more computer program modules. The computer program modules may include one or more of a space module 116, a space account module 118, a group module 120, an overarching group module 122, a communication interface module 124, a synchronous communications module 126, an affiliate status module 128, an asynchronous communications module 130, a privileges module 132, an alert module 134, a broadcast module 136, and/or other modules.

The space module 116 may be configured to provide one or more virtual spaces to users via client computing platforms 106. As used herein, a "virtual space" may include one or more social network games and/or other virtual spaces. A virtual space may be provided via a virtual environment provided by environment module 110 of virtual environment server 102. For example, a user may be required to be engaged in a virtual environment in order to engage in a virtual space. According to various implementations, one or more instances of a single given virtual space may be provided via one or more different virtual environments.

The space module 116 may determine views of the virtual space. The views may then be communicated (e.g., via streaming, via object/position data, and/or other information) from virtual space server 104 to client computing platforms 106 for presentation to users. The view determined and transmitted to a given client computing platform 106 may correspond to a user character being controlled by a user via the given client computing platform 106. The view determined and transmitted to a given client computing platform 106 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

An instance of a virtual space may comprise a simulated space that is accessible by users via clients (e.g., client computing platforms 106) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semisynchronous.

The above description of the manner in which views of virtual spaces are determined by space module 116 is not intended to be limiting. The space module 116 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of a virtual space executed by space module 116, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 106. The users may interact with each other through communications exchanged within the virtual space. Such communications may include one or more of textual chat, instant messages, private messages, voice communications, and/or other communications. Communications may be received and entered by the users via their respective client computing platforms 106. Communications may be routed to and from the appropriate users through virtual space server 104 and/or virtual environment server 102. Within the virtual space, users may participate in a game. The game may be an activity within the space (e.g., a virtual card or board game within the space), or the game may actually be the space (e.g., an online role-playing game, massively multiplayer online game, a social online game, and/or other games).

The space account module 118 may be configured to manage accounts associated with the individual users for individual virtual spaces. The accounts may include user information associated with the individual users. Such user information may include one or more of identification information; inventory information; financial information; relationship information; information related to the users determined by one or more of the other modules 116, 120, 122, 124, 126, and/or 128; demographic information; usage information; past purchase history; and/or other information related to the users. The identification information may include one or more of a username, an avatar name, a real world identification, and/or other identification information. The inventory information may identify virtual objects, virtual currency, and/or other assets available to the users. The virtual objects and/or virtual currency available to a given user may include the virtual objects and/or the virtual currency that is under the control of the given user within the virtual space. The financial information may include payment information such as an account identification that identifies an account that can be used by the user to purchase virtual goods and/or virtual currency for use within the virtual space. The funds available in the account may include real world money or funds, virtual money or funds that are not usable within the virtual space, and/or other funds.

The group module 120 may be configured to a group module configured to establish and/or manage affiliations within individual virtual spaces. A given affiliation within a given virtual space may include a discrete group of users. For example, a first affiliation within a first virtual space may include a first user, a second user, and/or a discrete set of other users. Examples of an affiliation may include an alliance, a guild, a faction, a club, an association, a group, a crew, a band, a clan, a family, fellowship, a gang, a league, a partnership, a syndicate, a society, a tribe, a troop, a company, and/or other affiliations that include a discrete group of individuals.

The group module 120 may establish affiliations based on affiliation requests and acceptances received from users. Establishment of an affiliation may be initiated by a single communication (e.g., a request) initiated by a given user requesting an affiliation between the given user and one or more other users. Establishment of an affiliation may require a first communication from the given user to be approved by the one or more other users. According to some implementations, group module 120 may establish affiliations intrinsically within the virtual space (e.g., faction-mates are formed based on avatar configuration), through recognized user behavior over time (e.g., raid members or player-versus-player partners), and/or other approaches for establishing affiliations.

Users belonging to an affiliation may have relationships with some or no functional significance, purpose, and/or impact within a given virtual space. Such relationships within the affiliation may include a leadership structure, a role structure, and/or other relationships within the affiliation. The functional significance of a relationship between users may vary across different virtual spaces. For example, a relationship between the first user and the second user in the first affiliation within the first virtual space may have a different functional significance than a relationship between the first user and the second user in a second affiliation in a second virtual space. By way of non-limiting example of the functional significance of an affiliation within an exemplary virtual space, affiliates within a virtual space may have certain capabilities among each other that are not available to non-affiliates such as sharing and/or trading goods, services, player characters, and/or items in the virtual space; and/or other capabilities among users belonging to an affiliation.

The overarching group module 122 may be configured to determine and/or manage one or more overarching affiliations. An overarching affiliation may encompass two or more affiliations from different virtual spaces that include substantially the same group of users. By way of non-limiting example, a given overarching affiliation may encompass an affiliation in one virtual space (e.g., a team) and an affiliation in another virtual space (e.g., a gang), where the two affiliations include substantially the same group of users. A given overarching affiliation may facilitate one or more of a cooperative attack, a cooperative defense, resource trading, troupe enforcements, and/or other actions carried out by a group in individual virtual spaces by individual users belonging to the given overarching affiliation. The group module 120 may be configured to automatically include a given user belonging to a given overarching affiliation in individual affiliations encompassed by the given overarching affiliation. A given user may be enabled to opt-in or opt-out of being automatically included in individual affiliations encompassed by an overarching affiliation.

The overarching group module 122 may be configured to link affiliations from different virtual spaces to yield an overarching affiliation. Such linking may be performed automatically, manually, and/or by a combination of automatic and manual operations. In some implementations, overarching group module 122 may monitor affiliations in two or more virtual spaces to determine affiliations including substantially the same group of users for inclusion in an overarching affiliation. A user belonging to affiliations in different virtual spaces may manually link the affiliations so as to be encompassed by an overarching affiliation. In some implementations, responsive to a first user joining a first affiliation in a first virtual space, the first user may be presented with an option to join one or more other affiliations in other virtual spaces that are encompassed by the same overarching affiliation as the first affiliation. Such an option may be presented even if the first user has not engaged one or more of the other virtual spaces, according to some implementations.

The communication interface module 124 may be configured to provide a communications interface for presentation to individual users. The communications interface may be presented to given user via a client computing platform 106 associated with that user. The communications interface may be configured to enable a given user to observe in-coming communications and provide out-going communications. According to some implementations, the communications interface may be presented within a virtual space provided by virtual space server 104. The communications interface may be presented within a virtual environment provided by virtual environment server 102. In some implementations, the communications interface may be presented outside of a virtual space and outside of a virtual environment. For example, the communications interface may be presented via a webpage that includes neither a virtual space nor a virtual environment. As another example, the communications interface may be provided via a mobile application on a mobile implementation of a client computing platform 106. Non-limiting and exemplary implementations of the communications interface are described in connection with FIG. 2.

The synchronous communications module 126 may be configured to facilitate synchronous communications via the communications interface between users belonging to one or more common affiliations. The synchronous communications module 126 may be configured to facilitate synchronous communications among users belonging to a common overarching affiliation. By way of non-limiting example, synchronous communications may include one or more of text-based instant messaging (IM) and/or chat, live voice and/or video communications, other forms of real-time direct communications, and/or other synchronous communications. The synchronous communications may be channeled across multiple virtual spaces and/or multiple environments. For example, in some implementations, the first user and the second user are enabled to exchange synchronous communications while the first user is engaged in the first virtual space and the second user is engaged in a second virtual space. Two or more users may engage in a single synchronous communications session. In some implementations, synchronous communications module 126 may be configured to facilitate file transfers between users. The synchronous communications module 126 may utilize, leverage, and/or otherwise interface with third-party synchronous communications services (e.g., Facebook chat, Google chat, ICQ, and/or other services), in accordance with some implementations.

The affiliate status module 128 may be configured to provide an indication via the communications interface of whether one or more users belonging to individual ones of the common affiliations and/or common overarching affiliations are available to exchange synchronous communications. According to various implementations, a given user may be available if the user is engaged in a specific virtual space, is engaged in a specific virtual environment, has checked or logged into the communication interface, has provided an indication that the given user is available, and/or is otherwise declared as being available to exchange synchronous communications. The indication may indicate which virtual space and/or virtual environment the given user is currently engaged in. Indications provided by affiliate status module 128 may be presented by one or more of a textual indication, a visual indicate, and/or another indication. In some implementations, indications provided by affiliate status module 128 may be presented as an affiliate list showing a number of users belonging to one or more common affiliations and/or one or more common overarching affiliations, along with their respective availabilities.

The asynchronous communications module 130 may be configured to facilitate asynchronous communications via the communications interface between users belonging to one or more common affiliations. The asynchronous communications module 130 may be configured to facilitate asynchronous communications among users belonging to a common overarching affiliation. By way of non-limiting example, asynchronous communications may include one or more of emails, communications based on a store-and-forward model, and/or other asynchronous communications. The asynchronous communications module 130 may be configured to accept, forward, deliver, and/or store asynchronous communications. The asynchronous communications module 130 may utilize, leverage, and/or otherwise interface with an asynchronous communications server (not depicted) to facilitate asynchronous communications. The asynchronous communications may by conveyed whether or not a receiving party is engaged in a virtual space or virtual environment. For example, the first user may be enabled to send the second user asynchronous communications regardless of whether the second user is engaged in a virtual space or a virtual environment.

The asynchronous communications module 130 may be configured to manage inboxes associated with individual users. For example, a first inbox may be associated with the first user such that the first inbox is configured to contain an asynchronous communication sent by the second user to the first user. The inboxes may be presented via the communications interface. A given inbox may have multiple instantiations in different virtual spaces and/or virtual environments. In some implementations, a user may access the user's inbox via a mobile application on a mobile implementation of a client computing platform 106. In some implementations, two or more asynchronous communications contained by a given inbox may be organized within the given inbox based on individual affiliations associated with the asynchronous communications contained by the given inbox. For example, one or more asynchronous communications associated with the first virtual space may be collocated in a list or file, while one or more asynchronous communications associated with the second virtual space may be collocated separately from the ones associated with the first virtual space.

The privileges module 132 may be configured to manage privileges associated with individual users based on statuses attributed to the individual users. Examples of such statuses may include statuses associated with one or more of progress within a virtual space; time spent engaging in a virtual space and/or virtual environment; a date on which a user joined an affiliation and/or overarching affiliation; a leadership and/or other role within a virtual space, affiliation, and/or overarching affiliation; and/or other statuses attributable to users. By way of non-limiting example, privileges may include being able to preview, approve, and/or edit communications of other users; having communications sent by a privileged user appear visually different from unprivileged users; being able to preview, approve, and/or edit alerts (discussed in further detail in connection with alert module 134; having enhanced broadcast rights (discussed further in connection with broadcast module 136); and/or other privileges associable to users. As a non-limiting illustration, the first user may be enabled to edit asynchronous communications of one or more other users belonging to the first affiliation responsive to a first privilege being associated with the first user and the first privilege being unassociated with the one or more other users belonging to the first affiliation. As another illustration, communications from the first user may be visibly distinct in the communications interface from communications from one or more other users responsive to a second privilege being associated with the first user and the second privilege being unassociated with the one or more other users belonging to the first affiliation.

The privileges module 132 may be configured to provide a privileged communications interface, which may be included in or separate from the communications interface provided by communication interface module 124. The privileged communications interface may enable a given privileged user to preview and/or edit communications sent by unprivileged users. Non-limiting and exemplary implementations of the privileged communications interface are described in connection with FIG. 2.

The alert module 134 may be configured to distribute alerts via the communications interface to individual users belonging to the one or more common affiliations and/or common overarching affiliations. Individual ones of the alerts may be distributed responsive to one or more predetermined events occurring within one or more virtual spaces associated with the one or more common affiliations and/or common overarching affiliations. By way of illustration, an alert may be sent to all members of a given overarching affiliation responsive to a battle situation within a virtual space encompassed by the given overarching affiliation. The alerts may be distributed regardless of whether the individual users belonging to the one or more common affiliations and/or common overarching affiliations are engaged in the one or more virtual spaces associated therewith. In some implementations, different forms of a given alert may be distributed to different users according to different privileges associated with those users. For example, a first alert sent to a user associated with a privilege may contain different information relative to the first alert sent to a user unassociated with the privilege.

The alerts may be presented in various manners. The alerts may be presented to users via the communications interface provided by the communication interface module 124. The alerts may be presented as synchronous communications, asynchronous communications, and/or other types of communications. The alert module 134 may be configured to provide an alerts interface, which may be included in or separate from the communications interface provided by communication interface module 124. The alerts interface may enable a given user to observe in-coming alerts. Non-limiting and exemplary implementations of the alerts interface are described in connection with FIG. 2.

The broadcast module 136 may be configured to enable one or more individual users to transmit a broadcast communication to two or more other users belonging to a common affiliation and/or common overarching affiliation. A broadcast communication may include a broadcast communication one or both of a synchronous communication or an asynchronous communication. The broadcast module 136 may be configured to transmit a broadcast communication regardless of whether individual recipient users are engaged in a virtual space and/or virtual environment. In some implementations, a privileged user may be enabled to preview, approve, and/or edit broadcast communications prior to the broadcast communications being delivered to other users.

The broadcast module 136 may be configured to provide a broadcast communications interface, which may be included in or separate from the communications interface provided by communication interface module 124. The broadcast communications interface may enable a given user to observe in-coming broadcast communications and/or provide outgoing broadcast communications. Non-limiting and exemplary implementations of the broadcast communications interface are described in connection with FIG. 2.

In some implementations, virtual environment server 102, virtual space server 104, client computing platforms 106, one or more external resources 138, and/or other components of system 100 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which virtual environment server 102, virtual space server 104, client computing platforms 106, external resources 138, and/or other components of system 100 may be operatively linked via some other communication media.

The virtual environment server 102 may comprise electronic storage 140, one or more processors 142, and/or other components. The virtual environment server 102 may include communication lines, or ports to enable the exchange of information with a network and/or other computing platforms. The processors 142 may be configured to execute computer program modules. The processors 142 may be configured to execute the computer program modules via one or more of hardware, software, and/or firmware. The computer program modules may include user module 108, environment module 110, interaction module 112, relationship module 114, and/or other computer program modules. Although system 100 may be described in certain sections herein as including virtual environment server 102, this is not intended to be limiting. The virtual environment server 102 may be separate and distinct from system 100, and may be provided by an entity that is separate from, for example, the entity providing virtual space server 104. In some implementations, the functionality attributed herein to virtual environment server 102 may be provided by virtual space server 104.

A given client computing platform 106 may include one or more processors configured to execute computer program modules. The computer program modules may be configured to enable an expert or user associated with the given client computing platform 106 to interface with virtual environment server 102, virtual space server 104, and/or other components of system 100, and/or provide other functionality attributed herein to client computing platforms 106. By way of non-limiting example, the given client computing platform 106 may include one or more of a desktop computer, a laptop computer, a handheld computer, a NetBook, a Smartphone, a gaming console, and/or other computing platforms.

The external resources 138 may include sources of information, hosts and/or providers of virtual environments and/or virtual spaces outside of system 100, external entities participating with system 100, and/or other resources. In some implementations, some or all of the functionality attributed herein to external resources 138 may be provided by resources included in system 100.

The virtual space server 104 may include electronic storage 144, one or more processors 146, and/or other components. The virtual space server 104 may include communication lines, or ports to enable the exchange of information with a network and/or other computing platforms. Illustration of virtual space server 104 in FIG. 1 is not intended to be limiting. The virtual space server 104 may include a plurality of hardware, software, and/or firmware components operating together to provide the functionality attributed herein to virtual space server 104. For example, virtual space server 104 may be implemented by a cloud of computing platforms operating together as virtual space server 104.

Electronic storage 144 may comprise electronic storage media that electronically stores information. The electronic storage media of electronic storage 144 may include one or both of system storage that is provided integrally (i.e., substantially non-removable) with virtual space server 104 and/or removable storage that is removably connectable to virtual space server 104 via, for example, a port (e.g., a USB port, a firewire port, etc.) or a drive (e.g., a disk drive, etc.). Electronic storage 144 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 144 may include one or more virtual storage resources (e.g., cloud storage, a virtual private network, and/or other virtual storage resources). Electronic storage 144 may store software algorithms, information determined by processor 146, information received from virtual environment server 102, information received from client computing platforms 106, and/or other information that enables virtual space server 104 to function as described herein.

Processor(s) 146 is configured to provide information processing capabilities in virtual space server 104. As such, processor 146 may include one or more of a digital processor, an analog processor, a digital circuit designed to process information, an analog circuit designed to process information, a state machine, and/or other mechanisms for electronically processing information. Although processor 146 is shown in FIG. 1 as a single entity, this is for illustrative purposes only. In some implementations, processor 146 may include a plurality of processing units. These processing units may be physically located within the same device, or processor 146 may represent processing functionality of a plurality of devices operating in coordination. The processor 146 may be configured to execute space module 116, space account module 118, group module 120, overarching group module 122, communication interface module 124, synchronous communications module 126, affiliate status module 128, asynchronous communications module 130, privileges module 132, alert module 134, broadcast module 136, and/or other computer program modules. Processor 146 may be configured to execute modules 116, 118, 120, 122, 124, 126, 128, 130, 132, 134, 136, and/or other modules by software; hardware; firmware; some combination of software, hardware, and/or firmware; and/or other mechanisms for configuring processing capabilities on processor 146.

It should be appreciated that although modules 116, 118, 120, 122, 124, 126, 128, 130, 132, 134, and 136 are illustrated in FIG. 1 as being co-located within a single processing unit, in implementations in which processor 146 includes multiple processing units, one or more of modules 116, 118, 120, 122, 124, 126, 128, 130, 132, 134, and/or 136 may be located remotely from the other modules. The description of the functionality provided by the different modules 116, 118, 120, 122, 124, 126, 128, 130, 132, 134, and/or 136 described below is for illustrative purposes, and is not intended to be limiting, as any of modules 116, 118, 120, 122, 124, 126, 128, 130, 132, 134, and/or 136 may provide more or less functionality than is described. For example, one or more of modules 116, 118, 120, 122, 124, 126, 128, 130, 132, 134, and/or 136 may be eliminated, and some or all of its functionality may be provided by other ones of modules 116, 118, 120, 122, 124, 126, 128, 130, 132, 134, and/or 136. As another example, processor 146 may be configured to execute one or more additional modules that may perform some or all of the functionality attributed below to one of modules 116, 118, 120, 122, 124, 126, 128, 130, 132, 134, and/or 136.

Figure 2:
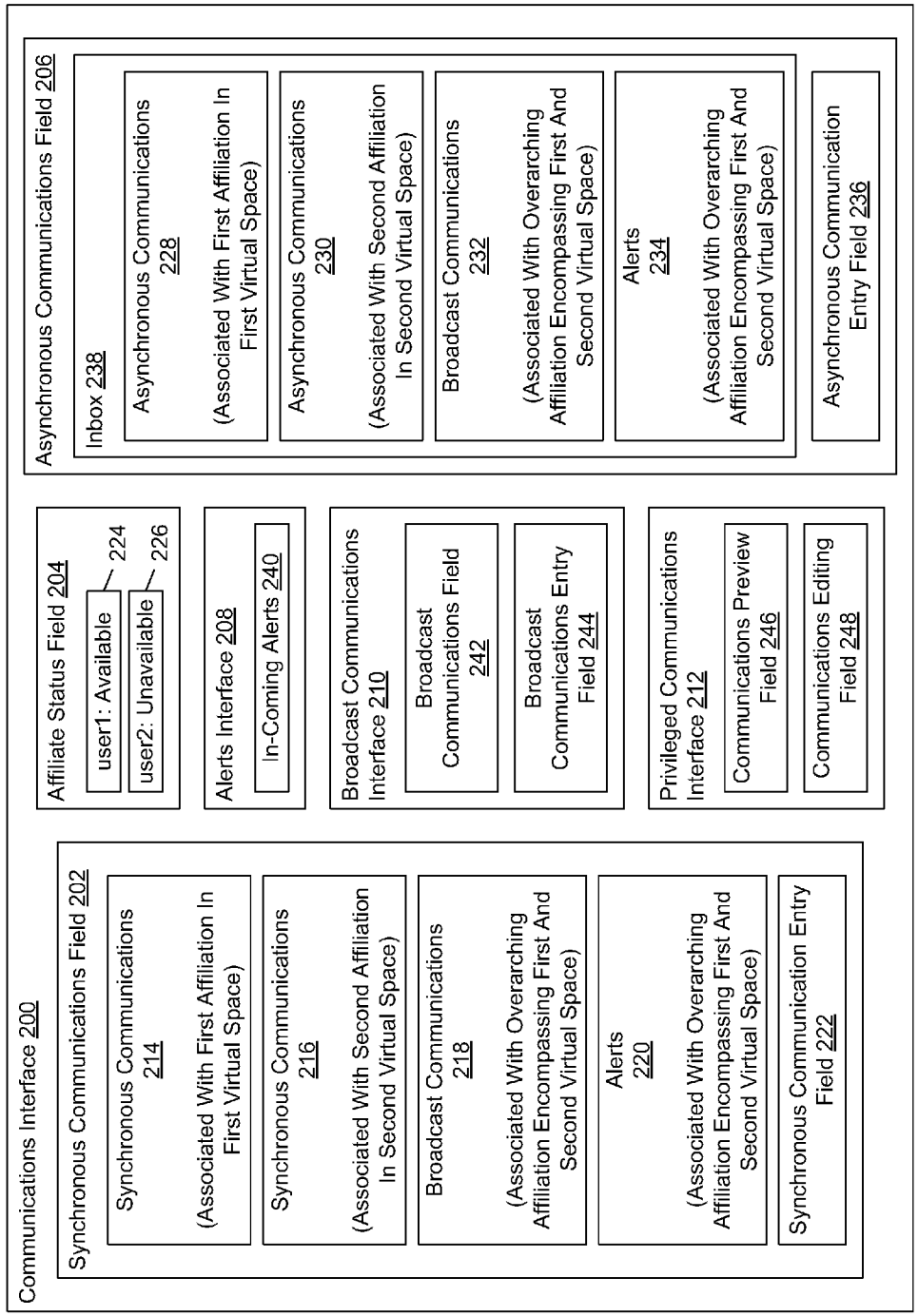
FIG. 2 illustrates a communications interface configured to enable a given user to observe in-coming communications and provide out-going communications, in accordance with one or more implementations.

FIG. 2 illustrates a communications interface 200 configured to enable a given user to observe in-coming communications and provide out-going communications, in accordance with one or more implementations. The communications interface 200 may be presented to a given user via a client computing platform 106 associated with that user. The communications interface 200 may be presented within a virtual environment provided by virtual environment server 102, within a virtual space provided by virtual space server 104, and/or outside of a virtual environment and/or virtual space. In some implementations, communications interface 200 may be presented by a user via a mobile application on a mobile implementation of a client computing platform 106. The user interface 200 may be provided by communication interface module 124 and/or one or more other modules included in system 100, other components of system 100, and/or other resources. As depicted in FIG. 2, communications interface 200 includes a synchronous communications field 202, an affiliate status field 204, an asynchronous communications field 206, an alerts interface 208, a broadcast communications interface 210, a privileged communications interface 212, and/or other elements. The depiction of communications interface 200 in FIG. 2 is not intended to be limiting as communications interface 200 may include more or less elements than those shown. For example, one or more of elements shown in FIG. 2 may be eliminated, and some or all of its functionality may be provided by one or more other elements.

The synchronous communications field 202 may be configured to present synchronous communications between users belonging to one or more common affiliations and/or common overarching affiliations. As depicted in FIG. 2, synchronous communications field 202 may include one or more of synchronous communications 214 associated with a first affiliation in a first virtual space, synchronous communications 216 associated with a second affiliation in a second virtual space, broadcast communications 218 associated with an overarching affiliation that encompasses the first and second affiliations, alerts 220 associated with the overarching affiliation, a synchronous communication entry field 222, and/or other elements. The synchronous communication entry field 222 may be configured to enable a user to enter out-going synchronous communications to one or more other users. In some implementations, synchronous communications may be grouped and/or otherwise organized based on an individual affiliation associated therewith. The synchronous communications field 202 may be facilitated and/or provided by a synchronous communications module that is the same or similar to synchronous communications module 126, in accordance with one or more implementations.

The affiliate status field 204 may be configured to provide an indication of whether one or more users belonging to individual ones of the common affiliations and/or common overarching affiliations are available to exchange synchronous communications. As depicted in FIG. 2, affiliate status field 204 may include status indication 224 showing that "user1" is available and status indication 226 showing that "user2" is unavailable. The affiliate status field 204 may be provided by an affiliate status module that is the same or similar to affiliate status module 128, in accordance with one or more implementations.

The asynchronous communications field 206 may be configured to present asynchronous communications between users belonging to one or more common affiliations and/or common overarching affiliations. As depicted in FIG. 2, asynchronous communications field 206 may include one or more of asynchronous communications 228 associated with a first affiliation in a first virtual space, asynchronous communications 230 associated with a second affiliation in a second virtual space, broadcast communications 232 associated with an overarching affiliation that encompasses the first and second affiliations, alerts 234 associated with the overarching affiliation, an asynchronous communication entry field 236, and/or other elements. The asynchronous communication entry field 236 may be configured to enable a user to enter out-going synchronous communications to one or more other users. In some implementations, asynchronous communications may be grouped and/or otherwise organized based on an individual affiliation associated therewith. The asynchronous communications field 206 may be facilitated and/or provided by an asynchronous communications module that is the same or similar to asynchronous communications module 130, in accordance with one or more implementations.

The asynchronous communications field 206 may include an inbox 238 configured to contain and/or organize asynchronous communications. In some implementations, two or more asynchronous communications contained by inbox 238 may be organized based on individual affiliations associated with the asynchronous communications contained by inbox 238. For example, one or more asynchronous communications associated with the first virtual space may be collocated in a list or file, while one or more asynchronous communications associated with the second virtual space may be collocated separately from the ones associated with the first virtual space.

The alerts interface 208 may be configured to enable a given user to observe one or more in-coming alerts 240. The alerts interface 208 may be provided by an alert module that is the same or similar to alert module 134, in accordance with one or more implementations.

The broadcast communications interface 210 may be configured to enable a given user to observe in-coming broadcast communications and/or provide out-going broadcast communications. As depicted in FIG. 2, broadcast communications interface 210 may include a broadcast communications field 242 configured to present in-coming broadcast communications, a broadcast communication entry field 244 configured to enable a user to provide out-going broadcast communications, and/or other elements. The broadcast communications interface 210 may be provided by a broadcast module that is the same or similar to broadcast module 136, in accordance with one or more implementations.

The privileged communications interface 212 may be configured to enable a given privileged user to preview and/or edit communications sent by unprivileged users. As depicted in FIG. 2, privileged communications interface 212 may include a communication preview field 246 configured to present communications provided by unprivileged users prior to delivery, a communication editing field 248 configured to enable editing of communications provided by unprivileged users prior to delivery. The privileged communications interface 212 may be provided by a privileges module that is the same or similar to privileges module 132, in accordance with one or more implementations.

Figure 3:
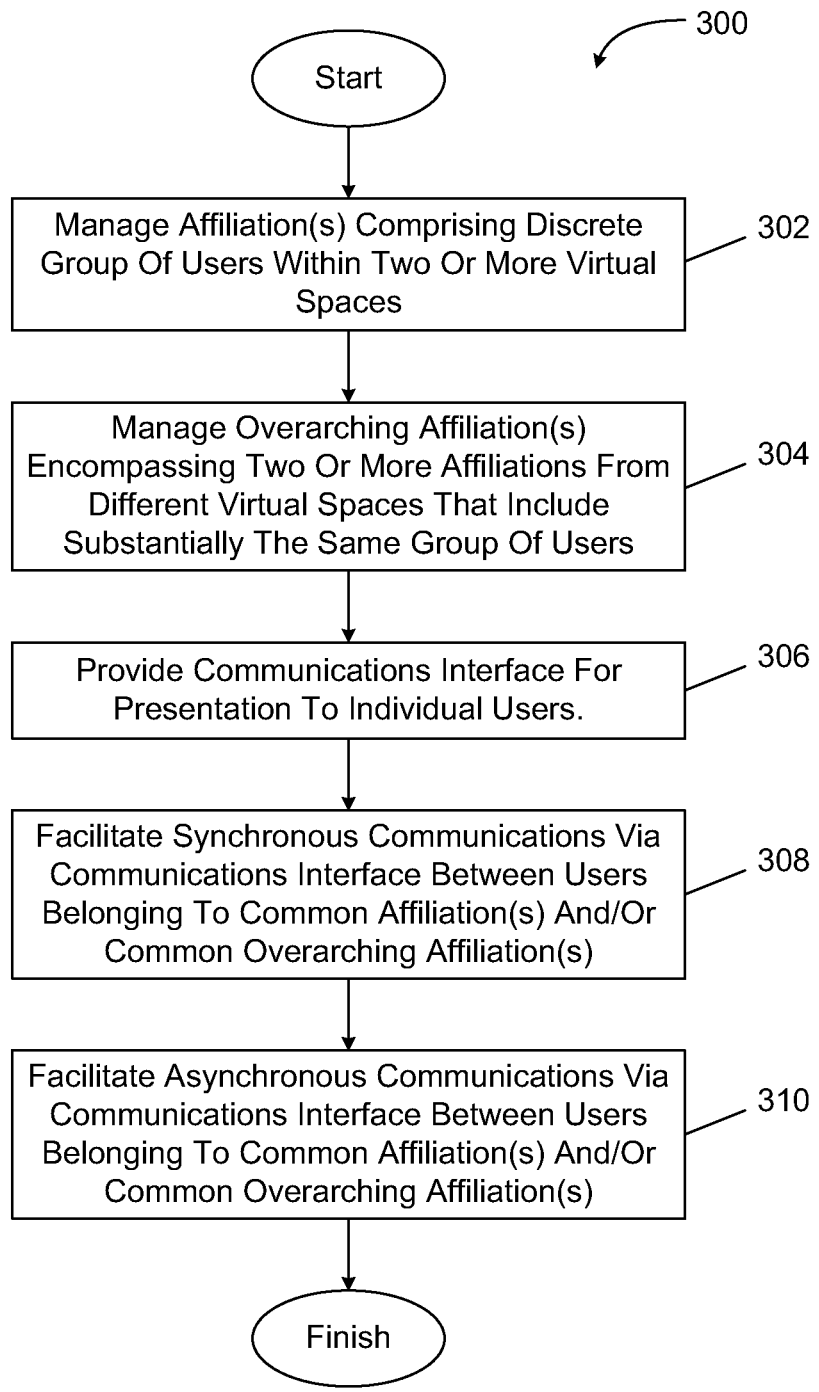
FIG. 3 illustrates a method for facilitating communications among users belonging to affiliations spanning two or more virtual spaces accessible via virtual environments, in accordance with one or more implementations.

FIG. 3 illustrates a method 300 for facilitating communications among users belonging to affiliations spanning two or more virtual spaces accessible via virtual environments, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, affiliations within individual ones of the two or more virtual spaces may be managed. The affiliations may comprise a first affiliation within a first virtual space between a group of users including a first user and a second user. Operation 302 may be performed by a group module that is the same or similar to group module 120, in accordance with one or more implementations.

At an operation 304, one or more overarching affiliations may be managed. Individual ones of the overarching affiliations may encompass two or more affiliations from different virtual spaces that include substantially the same group of users. Operation 304 may be performed by an overarching group module that is the same or similar to overarching group module 122, in accordance with one or more implementations.

At an operation 306, a communications interface may be provided for presentation to individual users. The communications interface may be configured to enable a given user to observe in-coming communications and provide out-going communications. Operation 306 may be performed by a communication interface module that is the same or similar to communication interface module 124, in accordance with one or more implementations.

At an operation 308, synchronous communications may be facilitated via the communications interface between users belonging to one or more common affiliations and/or common overarching affiliations. In some implementations, the first user and the second user may be enabled to exchange synchronous communications while the first user is engaged in the first virtual space and the second user is engaged in a second virtual space. Operation 308 may be performed by a synchronous communications module that is the same or similar to synchronous communications module 126, in accordance with one or more implementations.

At an operation 310, asynchronous communications may be facilitated via the communications interface between users belonging to one or more common affiliations and/or common overarching affiliations. In some implementations, the first user may be enabled to send the second user asynchronous communications regardless of whether the second user is engaged in a virtual space or a virtual environment. Operation 310 may be performed by an asynchronous communications module that is the same or similar to asynchronous communications module 130, in accordance with one or more implementation.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate communications among users belonging to affiliations spanning two or more online games accessible via virtual environments, the system comprising:
    one or more processors configured to execute computer program modules, the computer program modules comprising:
        a group module configured to manage affiliations within individual ones of the two or more online games, a given affiliation within a given online game comprising a discrete group of users with a relationship having a functional significance within the given online game that has an impact on game play within the given online game, wherein the affiliations comprise a first affiliation within a first online game between a group of users including a first user and a second user, the first affiliation having a functional significance that has an impact on game play within the first online game, and a second affiliation within a second online game between a group of users including the first user and the second user, the second affiliation having a functional significance that has an impact on game play within the second online game;
        an overarching group module configured to manage one or more overarching affiliations, individual ones of the overarching affiliations encompassing affiliations from different online games that include substantially the same group of users, such that the overarching affiliations comprise a first overarching affiliation between the group of users including the first user and the second user encompassing the first affiliation in the first online game and the second affiliation in the second online game;
        a communications interface module configured to provide a communications interface for presentation to individual users, the communications interface being configured to enable a given user to observe in-coming communications and provide out-going communications; and
        a synchronous communications module configured to facilitate synchronous communications via the communications interface between users belonging to common overarching affiliations, wherein the first user and the second user are enabled to exchange synchronous communications while the first user is engaged in the first online game and the second user is engaged in a second online game.

2. The system of claim 1, wherein the communications interface is presented within one or both of a online game or a virtual environment.

3. The system of claim 1, wherein the communications interface is presented outside of a online game and outside of a virtual environment.

4. The system of claim 1, wherein two or more synchronous communications are spatially grouped within the communications interface based on individual affiliations associated with the two or more synchronous communications.

5. The system of claim 1, wherein the computer program modules further comprise an affiliate status module configured to provide an indication via the communications interface of whether one or more users belonging to individual ones of the affiliations are available to exchange synchronous communications.

6. The system of claim 5, wherein the affiliate status module is further configured to provide an indication of whether one or more users belonging to a common overarching affiliation are available to exchange synchronous communications, the common overarching affiliation encompassing two or more affiliations from different online games that include substantially the same group of users.

7. The system of claim 1, wherein the computer program modules further comprise an asynchronous communications module configured to facilitate asynchronous communications via the communications interface between users belonging to one or more common affiliations, and wherein the first user is enabled to send the second user asynchronous communications regardless of whether the second user is engaged in a online game or a virtual environment.

8. The system of claim 7, wherein the asynchronous communications module is further configured to facilitate asynchronous communications among users belonging to a common overarching affiliation, the common overarching affiliation encompassing two or more affiliations from different online games that include substantially the same group of users.

9. The system of claim 7, wherein the asynchronous communications module is further configured to manage inboxes associated with individual users, the inboxes being presented via the communications interface, and wherein a first inbox is associated with the first user such that the first inbox is configured to contain an asynchronous communication sent by the second user to the first user.

10. The system of claim 9, wherein two or more asynchronous communications contained by a given inbox are organized within the given inbox based on individual affiliations associated with the asynchronous communications contained by the given inbox.

11. The system of claim 1, wherein the computer program modules further comprise a privileges module configured to manage privileges associated with individual users based on statuses attributed to the individual users, the privileges including a first privilege.

12. The system of claim 11, wherein the first user is enabled to edit asynchronous communications of one or more other users belonging to the first affiliation responsive to the first privilege being associated with the first user and the first privilege being unassociated with the one or more other users belonging to the first affiliation.

13. The system of claim 11, wherein communications from the first user are visibly distinct in the communications interface from communications from one or more other users responsive to the first privilege being associated with the first user and the first privilege being unassociated with the one or more other users belonging to the first affiliation.

14. The system of claim 1, wherein the computer program modules further comprise an alert module configured to distribute alerts via the communications interface to individual users belonging to the one or more common affiliations, individual ones of the alerts being distributed responsive to one or more predetermined events occurring within one or more online games associated with the one or more common affiliations, wherein the alerts are distributed regardless of whether the individual users belonging to the one or more common affiliations are engaged in the one or more online games associated with the one or more common affiliations.

15. The system of claim 14, wherein the alert module is further configured to distribute alerts to users belonging to a common overarching affiliation, the common overarching affiliation encompassing two or more affiliations from different online games that include substantially the same group of users.

16. The system of claim 14, wherein a first alert sent to a user associated with a privilege contains different information relative to the first alert sent to a user unassociated with the privilege.

17. The system of claim 1, wherein the computer program modules further comprise a broadcast module configured to enable the first user to transmit one or both of a synchronous communication or an asynchronous communication to two or more other users belonging to the first affiliation associated with the first online game regardless of whether individual ones of the two or more other users are engaged in the first online game.

18. The system of claim 17, wherein the broadcast module is further configured to enable the first user to transmit one or both of a synchronous or an asynchronous communication to users belonging to a common overarching affiliation, the common overarching affiliation encompassing two or more affiliations from different online games that include substantially the same group of users.

19. A system configured to facilitate communications among users belonging to affiliations spanning two or more online games accessible via virtual environments, the system comprising:
  one or more processors configured to execute computer program modules, the computer program modules comprising:
    a group module configured to manage affiliations within individual ones of the two or more online games, a given affiliation within a given online game comprising a discrete group of users with a relationship having a functional significance within the given online game that has an impact on game play within the given online game, wherein the affiliations comprise a first affiliation within a first online game between a group of users including a first user and a second user, the first affiliation having a functional significance that has an impact on game play within the first online game, and a second affiliation within a second online game between a group of users including the first user and the second user, the second affiliation having a functional significance that has an impact on game play within the second online game;
    an overarching group module configured to manage one or more overarching affiliations, individual ones of the overarching affiliations encompassing affiliations from different online games that include substantially the same group of users, such that the overarching affiliations comprise a first overarching affiliation between the group of users including the first user and the second user encompassing the first affiliation in the first online game and the second affiliation in the second online game;
    a communications interface module configured to provide a communications interface for presentation to individual users, the communications interface being configured to enable a given user to observe in-coming communications and provide out-going communications; and
    an asynchronous communications module configured to facilitate asynchronous communications via the communications interface between users belonging to common overarching affiliations, wherein the first user is enabled to send the second user asynchronous communications regardless of whether the second user is engaged in a online game or a virtual environment.

20. The system of claim 19, wherein the computer program modules further comprise a synchronous communications module configured to facilitate synchronous communications via the communications interface between users belonging to one or more common affiliations, wherein the first user and the second user are enabled to exchange synchronous communications while the first user is engaged in the first online game and the second user is engaged in a second online game.

21. The system of claim 20, wherein the synchronous communications module is further configured to facilitate synchronous communications among users belonging to a common overarching affiliation, the common overarching affiliation encompassing two or more affiliations from different online games that include substantially the same group of users.

22. The system of claim 19, wherein the computer program modules further comprise an alert module configured to distribute alerts via the communications interface to individual users belonging to a common overarching affiliation, the common overarching affiliation encompassing two or more affiliations from different online games that include substantially the same group of users, individual ones of the alerts being distributed responsive to one or more predetermined events occurring within one or more online games encompassed by the common overarching affiliation, wherein the alerts are distributed regardless of whether the individual users belonging to the common overarching affiliation are engaged in the one or more online games encompassed by the common overarching affiliation.

23. The system of claim 1, wherein the computer program modules further comprise a broadcast module configured to enable the first user to transmit one or both of a synchronous communication or an asynchronous communication to two or more other users belonging to a common overarching affiliation, the common overarching affiliation encompassing two or more affiliations from different online games that include substantially the same group of users regardless of whether individual ones of the two or more other users are engaged in the first online game.

24. A method for facilitating communications among users belonging to affiliations spanning two or more online games accessible via virtual environments, the method comprising:
  managing affiliations within individual ones of the two or more online games, a given affiliation within a given online game comprising a discrete group of users with a relationship having a functional significance within the given online game that has an impact on game play within the given online game, wherein the affiliations comprise a first affiliation within a first online game between a group of users including a first user and a second user, the first affiliation having a functional significance that has an impact on game play within the first online game, and a second affiliation within a second online game between a group of users including the first user and the second user, the second affiliation having a functional significance that has an impact on game play within the second online game;
  managing one or more overarching affiliations, individual ones of the overarching affiliations encompassing affiliations from different online games that include substantially the same group of users, such that the overarching affiliations comprise a first overarching affiliation between the group of users including the first user and the second user encompassing the first affiliation in the first online game and the second affiliation in the second online game;
  providing a communications interface for presentation to individual users, the communications interface being configured to enable a given user to observe in-coming communications and provide out-going communications; and one or both of:
  facilitating synchronous communications via the communications interface between users belonging to common overarching affiliations, wherein the first user and the second user are enabled to exchange synchronous communications while the first user is engaged in the first online game and the second user is engaged in a second online game; or
  facilitating asynchronous communications via the communications interface between users belonging to common overarching affiliations, wherein the first user is enabled to send the second user asynchronous communications regardless of whether the second user is engaged in a online game or a virtual environment.

25. The method of claim 24, further comprising providing an indication via the communications interface of whether one or more users belonging to a common overarching affiliation are available to exchange synchronous communications.

26. The method of claim 24, further comprising managing privileges associated with individual users based on statuses attributed to the individual users, the privileges including a first privilege, wherein (1) the first user is enabled to edit asynchronous communications of one or more other users belonging to a common overarching affiliation responsive to the first privilege being associated with the first user and the first privilege being unassociated with the one or more other users belonging to the common overarching affiliation, and/or (2) communications from the first user are visibly distinct in the communications interface from communications from one or more other users responsive to the first privilege being associated with the first user and the first privilege being unassociated with the one or more other users belonging to the common overarching affiliation.

27. The method of claim 24, further comprising distributing alerts via the communications interface to individual users belonging to a common overarching affiliation, individual ones of the alerts being distributed responsive to one or more predetermined events occurring within one or more online games encompassed by the common overarching affiliation, wherein the alerts are distributed regardless of whether the individual users belonging to the common overarching affiliation are engaged in the one or more online games encompassed by the common overarching affiliation.

28. The method of claim 24, further comprising enabling the first user to transmit one or both of a synchronous communication or an asynchronous communication to two or more other users belonging to a common overarching affiliation regardless of whether individual ones of the two or more other users are engaged in a online game encompassed by the common overarching affiliation.

29. The system of claim 1, wherein the one or more overarching affiliations have a functional significance that has an impact on game play within the two or more online games, such that the first overarching affiliation has a functional significance that has an impact on game play for the group of users including the first user and the second user.

30. The system of claim 19, wherein the one or more overarching affiliations have a functional significance that has an impact on game play within the two or more online games, such that the first overarching affiliation has a functional significance that has an impact on game play for the group of users including the first user and the second user.

31. The method of claim 24, wherein the one or more overarching affiliations have a functional significance that has an impact on game play within the two or more online games, such that the first overarching affiliation has a functional significance that has an impact on game play for the group of users including the first user and the second user.

* * * * *